3,265,962
METHOD OF AND APPARATUS FOR MICRO-SAMPLE CONDUCTIVITY MEASUREMENT
Carl L. Otto, Jr., Lummi Island, Wash.
Filed June 4, 1965, Ser. No. 461,402
12 Claims. (Cl. 324—30)

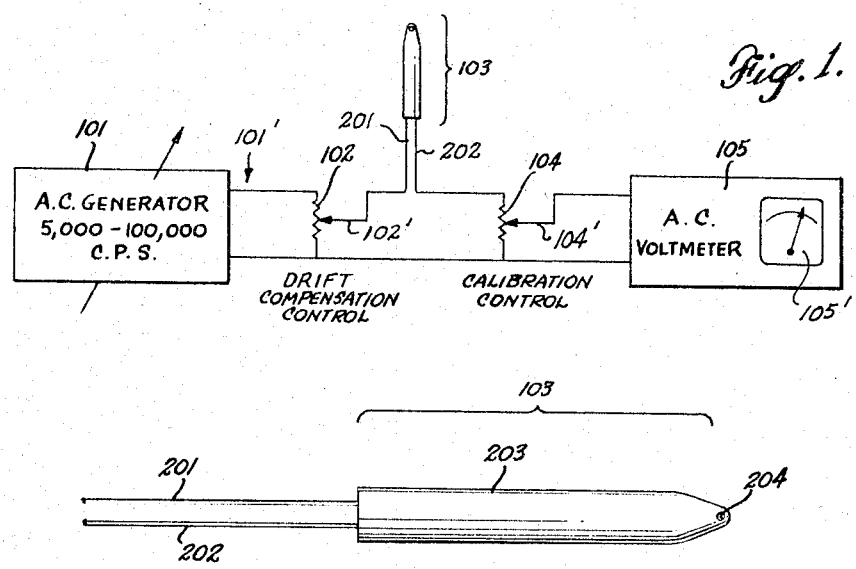
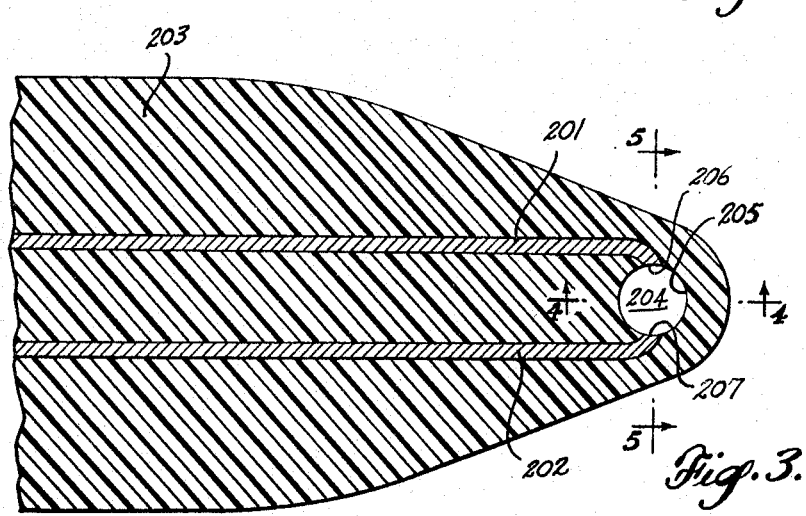
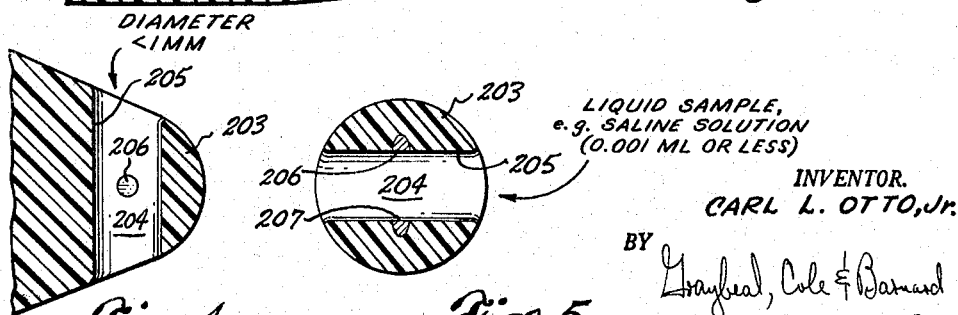

This application is a continuation-in-part of my copending and now abandoned application Serial No. 34,155, entitled Conductivity Measurement Method and Apparatus, and filed June 6, 1960.

The present invention relates to a method and apparatus for measuring the electrical conductivity of a liquid, and more particularly to conductimetric equipment and techniques capable of simply, rapidly and accurately testing a very small liquid sample, e.g. a sample having a volume on the order of 0.001 milliliter, for example.

Conventional means for measuring the conductivity of liquids provide highly unstable measuring conditions when scaled down to so-called "micro" proportions, such as when dealing with a sample which is as small as 0.001 milliliter in volume. For purposes of the present invention such a liquid sample having a volume on the order of about 0.001 milliliter or less is termed a "microsample."

It has been discovered that the unstable behavior when dealing with very small liquid samples is attributable to several complicating factors, including; (1) rapid decomposition of the sample by the measuring current, altering its conductivity and thus destroying the accuracy of the test, (2) contamination of the electrodes contacting the sample, caused by the generation of decomposition products, setting up a barrier to the measuring current, (3) uncertain uniformity as to the area of contact between the electrodes and the sample, and (4) rapid occurrence of evaporation, altering the concentration and temperature of the sample.

It has been discovered, with respect to very small liquid samples, that the matter of sample decomposition and contamination of the electrodes by decomposition products can be corrected by changing the frequency of the alternating electromotive force applied to the test electrodes. Conventional equipment is known to employ test frequencies on the order of 60 to 1000 cycles per second, which range of frequencies permits the measuring current to persist for at least 0.0005 second in one direction before reversing. When dealing with very small samples, this current duration in one direction is far too long, resulting in rapid electrolytic decomposition of the sample. According to the present invention and discovery, if the alternating electromotive force applied to the electrodes is reversed each 0.0001 second, the chemical decomposition and consequent deposition of decomposition products on the electrodes are arrested, and the very small sample exhibits a degree of electrolytic stability comparable to much larger samples. Reversal of the electromotive force each 0.0001 second corresponds to a frequency of 5,000 cycles per second. Further, characteristic of the present invention and discovery, it has been found that when the duration of current in one direction becomes less than about 5 microseconds, corresponding to a frequency of 100,000 cycles per second, the capacitative effect assumes such proportions as to render the test operation unstable or too insensitive for practical purposes. Optimally, with respect to the frequency of the alternating electromotive force applied to the test electrodes, it has been determined that such frequency should preferably be within the range from about 10,000 to about 20,000 cycles per second for microsamples.

With respect to the problem of maintaining uniformity as to the area of contact between the electrodes surfaces and the sample, when dealing with very small samples, it has been found that conventional sample-holding vessels and electrode arrangements tend to result in the generation and adherence of microscopic bubbles on the electrode surfaces, which also contribute to measurement inaccuracies. It has been discovered that a sample-holding cavity or chamber in the form of an open-ended capillary tube is self-cleaning as to the formation of such bubbles in that the liquid entering such tube tends to cling to the tube inner wall, to push all air out of the tube ahead of the liquid, and be self-supporting within the tube. Further, by employing a capillary tube type sample-holding cavity, and employing alternating electromotive force of a frequency within the range above indicated, any tendency toward formation of bubbles at the electrode surfaces is eliminated.

The matter of evaporation altering the concentration and temperature of a very small sample is dealt with very effectively by virtue of the apparatus and techniques of the present invention. In many respects, sample evaporation and consequent inaccuracies are basically a handling problem. It is impractical to stopper a minute test chamber, and under test conditions where the test sample is exposed to the atmosphere the evaporative effect causes a steady "creep" or "drift" in the conductivity reading, making the reading uncertain and transitory. It is an important advantage and feature of the present invention that the instability of the conductivity reading induced by sample evaporation can be compensated for by selecting a voltage value for the test current input which causes a slight, controlled heating of the sample. Such slight heating generates an opposing tendency of change or "drift" in the conductivity measuring current, and a proper balancing of the evaporation and heating effects has been found important to the attainment of readable stability of the conductivity reading in test situations where very small samples are under test. Such heating or temperature compensation control has been found to render the conductivity indication quite stable for substantial periods, notwithstanding the minute nature of the sample of the liquid under test. Further, a capillary tube type sample-holding cavity, as herein contemplated, of itself tends to minimize changes in concentration and temperature of the sample induced by evaporation of the liquid, in that the surface areas of the sample exposed to the air at the open ends of the capillary tube are relatively small as compared with its volume. Also, that portion of the liquid being tested in the capillary tube (i.e. the current carrying portion of the liquid directly between the electrode surfaces) and the electrode surfaces themselves, are not exposed to the atmosphere, nor to the effects of surface phenomena or to any external influence.

Consistent with the foregoing considerations, the various objects and advantages of the present invention include a presentation of conductimetric apparatus and techniques whereby the conductivity of liquids available only in very small amounts can be determined quickly, reliably, and accurately; whereby electrolytic decomposition of the sample during test is minimized; whereby a capillary tube type sample-holding chamber is employed which is self-filling and is easily cleaned and sanitized, and provides uniformity as to the amount of liquid tested each time under repetitive test conditions; whereby variations in microsample conductivity test results normally incident to evaporation can be compensated while the conductivity of a liquid is being tested; whereby liquid microsamples can be quickly selected and tested on a sensitive, accurate and quantitative basis; and whereby such apparatus operates at an alternating current frequency in a range discovered to be superior for conductivity determination when dealing with very small sample quantities.

These and other objects, features and advantages of the invention and discovery will be apparent from the following description of the typical form and application thereof, considered along with the accompanying illustrations, wherein:

FIG. 1 is a diagram in schematic and block form indicating a mobile test probe and associated circuit arrangement characteristic of the invention;

FIG. 2 is a side view of the test probe and its included capillary sample-holding capillary chamber, taken on an enlarged scale from the showing thereof in FIG. 1;

FIG. 3 is an enlarged fragmentary view in longitudinal section of the tip of the test probe, taken laterally through the sample-holding cavity;

FIG. 4 is a further cross-sectional view of the tip of the test probe, taken substantially along line 4—4 of FIG. 3; and FIG. 5 is a further cross-sectional view of the tip of the test probe, taken substantially along line 5—5 of FIG. 3.

Having reference to FIG. 1, the alternating current generator or oscillator 101 may be of any type known per se in the art, providing alternating current at a fixed or variable frequency value in the general range from about 5,000 to about 100,000 cycles per second, the alternating current generated being preferably but not necessarily in the form of a pure sine wave.

The output 101 from alternating current generator 101 is delivered to a potentiometer 102, the variable tap 102 of which provides a variable coupling means, also termable a drift compensation control and so labelled in FIG. 1, for varying the level of the alternating electromotive force applied to the test probe generally indicated at 103. As will be recognized, such variable coupling means 102 can be of any suitable type known per se for the purpose, provided only that such coupling means adjustably attenuates the potential supplied by generator 101 to a range of values suitable for compensating the drift characteristic caused by evaporational cooling of the sample. Generally, it has been found that the output from potentiometer 102 preferably should provide a voltage across the test electrodes surfaces 206, 207 in the range of from about 2 to about 10 volts R.M.S. under test conditions, and that such output optimally generates about 5 volts R.M.S. across the test electrode surfaces 206, 207 when measuring the conductivity of perspiration, for example.

The sample probe is generally indicated at 103 in FIG. 1, and is discussed in more detail below in connection with the enlarged views thereof shown at FIGS. 2 and 3–5.

In FIG. 1, a second potentiometer 104, and its variable tap 104', also termable a variable output or coupling means or calibration control and given the latter designation at FIG. 1, are provided to compensate the effect of the drift compensation control 102' on the conductivity reading. Such calibration control means 104' enables the operator to adjust the coupling between probe 103 and the alternating current voltmeter 105 so that pre-calibrated meter scale 105' thereof is a direct reading indicator of the specific conductance of the liquid under test. Said voltmeter 105 is suitably of any sensitive type, conventional per se, such as a vacuum tube voltmeter. Output response can also be otherwise indicated or otherwise sensed in any other manner desired.

In practice, pre-calibration of the reading meter scale 105' can suitably be accomplished by applying the capillary chamber 204 to test probe 103 to various samples of known conductivity under standardized conditions and marking corresponding graduations on the scale. Thereafter, when using the equipment, a direct reading indication of specific electrical conductance of an unknown sample can be obtained by using a sample of known value and adjusting calibration control 104' to make the meter scale 105' read correctly at the known value, and then proceeding with the measurement of the unknown sample.

As will be understood, the potentiometer 104 and its variable tap 104', together with voltmeter 105 and meter scale 105', are collectively termable an "output means" or "output circuit" providing a direct reading or other indication of the conductivity of the liquid under test in capillary chamber 204.

FIG. 2 presents a side elevation view and FIGS. 3–5 present enlarged, fragmentary cross-sectional views of the test probe 103. The electrically conductive lead-in wires or conductors are designated at 201 and 202, and are preferably of a noble metal such as platinum. The main body of the probe is designated at 203, and is fabricated of any suitable and known non-conductive material, such as plastic or glass, with respect to which the liquid to be tested is chemically inert and exhibits the physical phenomenon of capillary attraction within the sample holding chamber generally designated at 204. As known (and as defined by Webster's International Dictionary, second ed. unabridged, 1949), the phenomenon of "capillary attraction" pertains to the "apparent attraction . . . between a solid and a liquid caused by capillarity." "Capillarity" is in turn defined as the "action by which the surface of a liquid, where it is in contact with a solid (as in a capillary tube), is elevated or depressed . . . . Capillarity depends upon the relative attraction of the molecules of the liquid for each other and for those of the solid, and is especially observable in capillary tubes, where it determines the ascent or descent of the liquid above or below the level of the liquid in which the tube is dipped . . . ." As will be apparent, those skilled in the art and presented with a given liquid to be tested (such as a weakly saline aqueous solution), can readily determine appropriate known compositions for fabricating of the probe body 203 and conductors 201, 202, and appropriate diametric dimension for the sample-holding chamber 204 so that the liquid under test has a suitable volume and by capillary attraction fills or substantially fills the chamber 204, and is maintained in adherent contact with the electrode surfaces 206, 207 when the liquid sample is self-supporting within the open-ended chamber 204.

The lead-in conductor wires 201 and 202 are embedded in said main body 203 and terminates in respective electrode surfaces 206, 207, as shown in FIGS. 3–5. Capillary type sample-holding cavity or chamber 204 is defined by an electrically non-conductive inner surface or inner wall 205 and the electrode surfaces 206, 207, which surfaces 205, 206, 207 are also collectively termable a "collector surface" or "collector surface means" in that they collectively function to provide the means in which or on which the test liquid is gathered or "collected" by capillarity. Said cavity or chamber 204 preferably has a diameter substantially less than its length, the composition of the surfaces 205, 206, 207 and diameter of the chamber 204 and its length being selected to hold a desired sample quantity, say 0.001 milliliter for example, of the liquid by capillary attraction.

The diameter of cavity or chamber 204 provided by such inner surfaces 205, 207 may be of any suitable dimension consistent with the requirement that it be fillable or substantially fillable with the liquid under test by capillary attraction. In practice, for aqueous type test solutions, it has been found that the diameter of said capillary cavity or chamber 204 can be from about 1.0 millimeter to as small as about 0.1 millimeter, or even less, yet still provide a testable quantity of the liquid.

One simple manner of fabricating test probe 103 is to arrange a length of noble metal (e.g. Pt) conductor wire in the form of a reverse-bend loop, then mold around the loop body 203 of epoxy plastic or the like, then form the inner surface 204 and electrode surfaces 206, 207 as by drilling in a manner so that the end of the loop is cut by the drilling operation, then polishing the surfaces 204, 206, 207 to desired smoothness and size. By this technique, spaced conductors 201 and 202 are embedded in body 203, with the end surfaces 206, 207 thereof forming a part of the inner wall of the test chamber 204 shown in FIGS. 3–5.

For purpose of typical and therefore non-limitive illustration, a representative field of application and manner of use of the equipment is described below in connection with the analytical testing of a physiological excretion, particularly with respect to clinical or diagnostic analysis of perspiration for indication of abnormal salinity. Obviously, many other clinical, laboratory or like conductimetric analysis procedures are suceptible to advantageous use of the apparatus and techniques here presented, particularly when only a very minute quantity of the liquid to be tested is available and where the sample must be tested without analytical contamination.

Illustrative operation of the equipment begins by turning on generator 101, and filling the capillary chamber 204 with a standard solution of known specific conductance. The probe 103 is then held in the air to normalize external temperature effects, and drift compensation control means 102' is adjusted to the point of zero drift or creep, i.e. to stabilization of the reading of meter scale 105'. Calibration control 104' is then adjusted to bring the reading of meter scale 105' to the point thereon corresponding to the known conductivity of the standard solution. After chamber 204 is rinsed and blown dry, the apparatus is ready for immediate measurement of the unknown sample. If the specific electrical conductance of the standard solution is in the same general range as the conductivity of the liquid to be tested, the setting of drift compensation control means 102' establishes adequate drift stabilization during the reading of the specific conductance of the unknown solution and the specific conductance thereof is simply directly indicated on scale 105'. If it is found that excessive drift occurs in the reading when the tip of probe 103 encounters the unknown sample, a different standard solution should be selected, closer in specific conductance to the unknown sample, and the adjustment procedure repeated.

By employment of the pre-calibration technique, conductimetric determinations can readily be obtained which are reliably within 1% of the true value, i.e. with an error factor of less than 1%, even though the sample volume is as small as about 0.001 milliliter.

As a practical ramification of the very minute quantity of sample necessary to fill the capillary chamber 204, and the substantially instantaneous availability of the conductivity reading, a typical diagnostic utilization made possible by the equipment can proceed as follows. In determining the salinity of the perspiration of a medical patient at various areas along a body extremity, such as an arm for example, and assuming substantial surface perspiration is excreting from the extremity (i.e. the physiological origin of the liquid), a compilation or graph of the salinity at various areas along the extremity can be prepared simply by applying or wiping the tip of the test probe successively and progressively along skin areas of the extremity, the perspiration attracted capillarity within the chamber 204 at each point being rinsed out with distilled water and the chamber being blown dry preparatory to application of the tip of the probe against the next skin area.

In view of the foregoing, various further modifications and variations in the apparatus and utilization techniques characteristic of the invention and discovery will readily occur to those skilled in the art. Thus, for example, should the liquid to which the instrument is addressed have very low conductivity, governing sensitivity requirements can involve the incorporation of suitable alternating current amplifier means between calibration control 104' and the input to voltmeter 105. Similarly, should automatic compensation as to evaporation induced losses and/or direct reading calibration be desired, the drift compensation control 102' and calibration control 104' can be mechanically ganged, or compensation control can be effected by electronic feedback circuitry known per se for automatic gain control purposes, for example, deriving from a detection of the amount of drift in the voltage input to voltmeter 105 a correction bias functioning to appropriately compensate the attenuation at the output 101' of generator 101. Likewise, although the form of equipment illustrated diagrammatically in FIG. 1 includes at meter 105' a visually readable, preferably direct reading indication of the conductivity of the sample, it will be understood that other indicating means or test output current utilizing means can be employed. Thus, by way of further example, the current through the sample sensed by the variable tap of calibration control 104', as shown in FIG. 1, can be utilized either directly or indirectly to generate a control signal for effecting an external regulatory function.

These and other variations, modifications, features, applications, and techniques of utilization of the invention and discovery are to be understood as characterizing the present invention, and are to be recognized as within the scope thereof as defined by the following claims.

What is claimed is:

1. The method of measuring the electrical conductivity of a very small sample of liquid, comprising: gathering and holding said sample solely by means of capillary attraction; passing through the sample an alternating electrical current having a frequency of from about five thousand cycles per second to about one hundred thousand cycles per second; and providing from the extent of electrical current through the sample an indication which is a function of the electrical conductivity of said liquid.

2. The method of measuring the conductivity of a microsample of liquid, comprising: gathering and electrically isolating the sample of liquid in contact with closely spaced electrode surfaces of limited area by capillary attraction; applying to the isolated sample through said electrode surfaces an alternating electromotive force of a frequency of from about five thousand cycles per second to about one hundred thousand cycles per second; and indicating the conductivity of the liquid sample responsive to the extent of current passing between said electrode surfaces.

3. In combination with a very small sample of a liquid, apparatus for holding the liquid sample and measuring the conductivity thereof, said apparatus comprising: a sample collector having a surface to which said liquid is drawn and retained solely by capillary attraction; spaced electrode surfaces forming a part of such collector surface; a source of alternating electromotive force of a frequency from about five thousand cycles per second to about one hundred thousand cycles per second electrically connected with said electrode surfaces; and means responsive to the extent of current through said electrode surfaces for indicating the conductivity of said liquid.

4. The method of measuring the conductivity of a small quantity of liquid, comprising; applying an alternating electromotive force of frequency from about five thousand to about one hundred thousand cycles per second across at least a portion of the liquid, maintaining the electromotive force applied to said liquid at a level causing a degree of heat generation in said liquid which substantially compensates for the loss of heat therefrom occasioned by evaporation and substantially stabilizes the amount of current through said liquid, sensing the amount of current through said liquid, and generating from such current a substantially stable indication of the conductivity of the liquid.

5. The method of claim 4, comprising maintaining the electromotive force applied to said sample in the range from about two to about ten volts.

6. The method of claim 4, as applied to measuring the conductivity of an aqueous, saline solution.

7. The method of claim 6, as applied to determining the conductivity of a physiological excretion, and further comprising applying a liquid holding chamber directly to said liquid at its physiological origin.

8. An apparatus for measuring the conductivity of a small sample of liquid, comprising a mobile test probe including a sample-holding chamber in the form of a tube open at both ends and of a size to retain a sample of the liquid having a volume of not more than about 0.001 milliliter, spaced electrodes having electrode surfaces forming a part of the inner wall of said tube, means applying an alternating electromotive force to said electrode surfaces at a frequency of from about five thousand cycles per second to about one hundred thousand cycles per second, and means responsive to the amount of current through a liquid sample under test in said chamber for indicating the conductivity of said liquid sample.

9. An apparatus according to claim 8, wherein said tube extends substantially transversely of said test probe, and said electrode surfaces are configured to be of substantially the same diameter and be smooth-walled throughout, the said electrode surfaces being spaced from each other substantially transversely across a diameter of said tube.

10. Apparatus according to claim 8, wherein said tube has a diameter of less than about one millimeter.

11. In a conductivity measuring apparatus; a sample holder, a sample of liquid of a volume not more than about .001 milliliter held by said sample holder with a surface of the sample exposed to the atmosphere, spaced electrode surfaces forming part of the holder and in contact with the liquid sample, an alternating current supply circuit applying to said electrode surfaces alternating electromotive force at a frequency of from about five thousand cycles per second to about one hundred thousand cycles per second, an output circuit connected in series with said electrode surfaces and measuring the conductivity of the liquid sample as a function of the current between said electrode surfaces, and variable means in said supply circuit for controlling the electromotive force applied across said electrode surfaces and said output circuit, to vary the degree of heat generated in said liquid sample in a manner minimizing the loss of heat resulting from evaporation of a portion of said sample at the exposed surface thereof.

12. In a conductivity measuring apparatus according to claim 11, alternating current voltmeter means connected to said output circuit through variable coupling means for precalibrating said voltmeter means to give a direct reading indication of the conductivity of the liquid under test.

References Cited by the Examiner
UNITED STATES PATENTS

| | | | |
|---|---|---|---|
| 2,122,363 | 6/1938 | Christie | 324—30 |
| 2,412,363 | 12/1946 | Silverman | 324—30 X |
| 2,651,751 | 9/1953 | Heath | 324—30 |
| 2,886,771 | 5/1959 | Vincent | 324—30 |

WALTER L. CARLSON, *Primary Examiner.*

C. F. ROBERTS, *Assistant Examiner.*